(12) United States Patent
Sugimoto et al.

(10) Patent No.: US 8,623,956 B2
(45) Date of Patent: Jan. 7, 2014

(54) RUBBER COMPOSITION FOR SIDEWALL, INSULATION OR BREAKER CUSHION, PRODUCTION METHOD THEREOF, AND PNEUMATIC TIRE

(75) Inventors: Mutsuki Sugimoto, Kobe (JP); Hiroyuki Watanabe, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 231 days.

(21) Appl. No.: 13/013,849

(22) Filed: Jan. 26, 2011

(65) Prior Publication Data

US 2011/0184118 A1 Jul. 28, 2011

(30) Foreign Application Priority Data

Jan. 27, 2010 (JP) ................................ 2010-015625

(51) Int. Cl.
 *C08F 220/56* (2006.01)
(52) U.S. Cl.
 USPC ........................................................ 524/547
(58) Field of Classification Search
 USPC ............ 152/564; 526/335; 525/55, 242, 350, 525/385; 524/575.5
 See application file for complete search history.

(56) References Cited

U.S. PATENT DOCUMENTS

| 5,017,636 | A | 5/1991 | Hattori et al. |
| 7,427,646 | B2 | 9/2008 | Kondou |
| 8,163,821 | B2 | 4/2012 | Hiro |
| 8,273,804 | B2 * | 9/2012 | Nishimura ................... 523/155 |
| 2005/0148723 | A1 | 7/2005 | Kondou |
| 2006/0252879 | A1 | 11/2006 | Tanaka et al. |
| 2007/0100061 | A1 * | 5/2007 | Hattori et al. ................. 524/515 |
| 2011/0166254 | A1 | 7/2011 | Nishimura |
| 2011/0178235 | A1 * | 7/2011 | Sugimoto ................... 524/575.5 |
| 2011/0184118 | A1 | 7/2011 | Sugimoto et al. |
| 2011/0230613 | A1 | 9/2011 | Hiro |
| 2011/0253285 | A1 * | 10/2011 | Ichikawa et al. ............. 152/564 |
| 2011/0294949 | A1 | 12/2011 | Sakaki et al. |
| 2013/0030083 | A1 | 1/2013 | Taguchi et al. |
| 2013/0098523 | A1 | 4/2013 | Tsumori et al. |
| 2013/0102722 | A1 | 4/2013 | Tsumori et al. |
| 2013/0123387 | A1 | 5/2013 | Kagawa et al. |

FOREIGN PATENT DOCUMENTS

| JP | 4-356205 A | 12/1992 |
| JP | 6-329702 A | 11/1994 |
| JP | 6-329838 A | 11/1994 |
| JP | 8-143606 A | 6/1996 |
| JP | 2002-338734 A | 11/2002 |
| JP | 2003-94918 A | 4/2003 |
| JP | 2004-67027 A | 3/2004 |
| JP | 2005082622 | * 3/2005 |
| JP | 2005082622 A | * 3/2005 |
| JP | 2006-307018 A | 11/2006 |
| JP | 2007-169431 A | 7/2007 |
| JP | 2008-106099 A | 5/2008 |
| JP | 2009-13196 A | 1/2009 |
| JP | 2009-13197 A | 1/2009 |
| JP | 2009001680 | * 1/2009 |
| JP | 2009001680 A | * 1/2009 |
| JP | 2010013859 A | * 1/2010 |
| JP | 2010138359 | * 6/2010 |
| JP | 2010-174169 A | 8/2010 |
| WO | WO 03/082925 A1 | 10/2003 |
| WO | WO 2005/012365 A1 | 2/2005 |

OTHER PUBLICATIONS

Abstract of JP2009001680.*
Machine translation of JP2005082622.*
Abstract of JP2009001680 (2009).*
Machine translation of JP2005082622 (2005).*
United States Office Action for copending U.S. Appl. No. 13/006,606 dated May 9, 2013.
United States Office Action for copending U.S. Appl. No. 13/006,606 dated Oct. 10, 2012.
United States Office Action for copending U.S. Appl. No. 13/117,182 dated Feb. 5, 2013.
United States Office Action for copending U.S. Appl. No. 13/117,182 dated May 17, 2013.
United States Office Action for copending U.S. Appl. No. 13/560,090 dated Aug. 2, 2013.
United States Office Action for copending U.S. Appl. No. 13/672,880 dated Mar. 28, 2013.
U.S. Appl. No. 13/006,606, filed Jan. 14, 2011.
U.S. Appl. No. 13/117,182, filed May 27, 2011.
U.S. Appl. No. 13/560,090, filed Jun. 27, 2012.
U.S. Appl. No. 13/672,880, filed Nov. 9, 2012.

* cited by examiner

*Primary Examiner* — Ling Choi
*Assistant Examiner* — Catherine S Branch
(74) *Attorney, Agent, or Firm* — Birch, Stewart, Kolasch & Birch, LLP

(57) ABSTRACT

The present invention provides a rubber composition for a sidewall, an insulation, or a breaker cushion, which can achieve both excellent fuel economy (low heat build-up) and high flex crack growth resistance while having processability excellent enough to eliminate the need for mastication, and also provides a pneumatic tire produced using the rubber composition. The present invention relates to a rubber composition for a sidewall, an insulation, or a breaker cushion, including: a rubber component that contains a modified natural rubber with a phosphorus content of 200 ppm or less; and carbon black and/or a white filler.

22 Claims, No Drawings

RUBBER COMPOSITION FOR SIDEWALL, INSULATION OR BREAKER CUSHION, PRODUCTION METHOD THEREOF, AND PNEUMATIC TIRE

TECHNICAL FIELD

The present invention relates to a rubber composition for a sidewall, an insulation, or a breaker cushion, a method for producing the same, and a pneumatic tire produced using the same.

BACKGROUND ART

There has been an approach to decrease rolling resistance of a tire to suppress the heat build-up and thus improve fuel economy of a vehicle. The demand for improving fuel economy by means of tire improvement has increased in recent years. With respect to a sidewall, an insulation, and a breaker cushion as well as a tread which occupies a large part of a tire, the improvement in fuel economy has been desired. Examples of known methods for achieving low heat build-up of rubber compositions for these tire components include a method using a low-reinforcing filler, and a method using a smaller amount of a reinforcing filler. Also, an attempt has been made to achieve low heat build-up by using silica as a filler.

However, such methods for improving fuel economy using a filler cause reduction in the effect of reinforcing the rubber composition, and thereby problematically cause reduction in flex crack growth resistance. Hence, it has been difficult to achieve both excellent fuel economy and high flex crack growth resistance.

Sidewalls, insulations, and breaker cushions have been commonly produced using natural rubber. Here, natural rubber has a higher Mooney viscosity than those of other synthetic rubbers and thus has low processability. Therefore, natural rubber to be used is usually added with a peptizer and then masticated so that the rubber has a decreased Mooney viscosity. Requirement of such a process in the case of using natural rubber decreases productivity. Further, the mastication causes molecular chain scission in natural rubber, thereby problematically leading to a loss of the properties of a high-molecular-weight polymer that natural rubber essentially has (for example, high abrasion resistance, fuel economy, and rubber strength).

Patent Document 1 discloses a rubber composition prepared using natural rubber and epoxidized natural rubber in order to increase the content of non-petroleum resources. However, the rubber composition still has room for improving both fuel economy and flex crack growth resistance while simultaneously improving processability.

Patent Document 1: JP 2007-169431 A

SUMMARY OF THE INVENTION

The present invention aims to provide a rubber composition for a sidewall, an insulation, or a breaker cushion, which solves the above problems and can achieve both excellent fuel economy (low heat build-up) and high flex crack growth resistance while having processability excellent enough to eliminate the need for mastication. The present invention also aims to provide a pneumatic tire produced using the rubber composition.

The present invention relates to a rubber composition for a sidewall, including: a rubber component that contains a modified natural rubber with a phosphorus content of 200 ppm or less; and carbon black and/or a white filler.

The rubber composition preferably contains 5 to 60% by mass of the modified natural rubber per 100% by mass of the rubber component. The modified natural rubber preferably contains 0.3% by mass or less of nitrogen. Further, the modified natural rubber preferably has a gel content of 20% by mass or less, the gel content being determined as the content of a toluene-insoluble matter.

The modified natural rubber is preferably produced by saponifying natural rubber latex.

The white filler is preferably silica.

The present invention also relates to a method for producing the rubber composition for a sidewall, the method excluding the step of masticating the modified natural rubber.

The present invention also relates to a pneumatic tire including a sidewall produced from the rubber composition.

The present invention also relates to a rubber composition for an insulation, including: a rubber component that contains 15 to 95% by mass of a modified natural rubber with a phosphorus content of 200 ppm or less; and carbon black and/or a white filler.

The modified natural rubber preferably contains 0.3% by mass or less of nitrogen. Further, the modified natural rubber preferably has a gel content of 20% by mass or less, the gel content being determined as the content of a toluene-insoluble matter.

The modified natural rubber is preferably produced by saponifying natural rubber latex.

The white filler is preferably silica.

The present invention also relates to a method for producing the rubber composition for an insulation, the method excluding the step of masticating the modified natural rubber.

The present invention also relates to a pneumatic tire including an insulation produced from the rubber composition.

The present invention also relates to a rubber composition for a breaker cushion, including: a rubber component that contains 10 to 90% by mass of a modified natural rubber with a phosphorus content of 200 ppm or less; and carbon black and/or a white filler.

The modified natural rubber preferably contains 0.3% by mass or less of nitrogen. Further, the modified natural rubber preferably has a gel content of 20% by mass or less, the gel content being determined as the content of a toluene-insoluble matter.

The modified natural rubber is preferably produced by saponifying natural rubber latex.

The white filler is preferably silica.

The present invention also relates to a method for producing the rubber composition for a breaker cushion, the method excluding the step of masticating the modified natural rubber.

The present invention also relates to a pneumatic tire including a breaker cushion produced from the rubber composition.

The rubber compositions according to the present invention include a modified natural rubber with a phosphorus content of 200 ppm or less (hereinafter, also referred to as "HPNR"), and carbon black and/or a white filler. Thus, the rubber compositions achieve both excellent fuel economy (low heat build-up) and high flex crack growth resistance. Further, the rubber compositions have processability excellent enough to eliminate the particular need for mastication.

BEST MODE FOR CARRYING OUT THE INVENTION

The rubber compositions for a sidewall, an insulation, and a breaker cushion of the present invention (hereinafter, these rubber compositions are collectively referred to as "the rubber composition of the present invention") each include a rubber component that contains a modified natural rubber with a phosphorus content of 200 ppm or less, and carbon black and/or a white filler. The present invention employs a modified natural rubber (HPNR) with reduced or no levels of proteins, gel fraction, and phospholipids contained in natural rubber (NR). Therefore, fuel economy can be improved (i.e. heat build-up can be reduced) without reducing the amount of the carbon black and/or the white filler. Hence, high rubber strength can be simultaneously obtained by the reinforcing effect of the filler, thereby resulting in both good fuel economy (low heat build-up) and high flex crack growth resistance.

Unvulcanized rubber compositions with HPNR are excellent in productivity because they show good processability when being mixed with other ingredients such as a filler without preliminary mastication.

The modified natural rubber (HPNR) has a phosphorus content of 200 ppm or less. A phosphorus content of more than 200 ppm tends to cause an increase in the gel content during storage and an increase in the tan δ of the vulcanized rubber composition. The phosphorus content is preferably 150 ppm or less, and more preferably 100 ppm or less. Here, the phosphorus content can be measured by a conventional method such as ICP emission spectrometry. The phosphorus is derived from phospholipids (phosphorus compounds).

The modified natural rubber preferably contains substantially no phospholipids. Here, the phrase "contains substantially no phospholipids" means that no phospholipid peak is present in a range of −3 to 1 ppm in a $^{31}$P NMR measurement of an extract obtained by chloroform extraction from a natural rubber sample. The phospholipid peak present in a range of −3 to 1 ppm refers to a peak corresponding to a phosphate ester structure in the phosphorus component of phospholipids.

The modified natural rubber preferably contains 0.3% by mass or less, and more preferably 0.15% by mass or less of nitrogen. A nitrogen content of more than 0.3% by mass tends to cause an increase in Mooney viscosity during storage. The nitrogen is derived from proteins. The nitrogen content can be determined by a conventional method such as the Kjeldahl method.

The modified natural rubber preferably has a gel content of 20% by mass or less, more preferably 15% by mass or less, and still more preferably 10% by mass or less. A gel content of more than 20% by mass tends to result in reduced processability such as increased Mooney viscosity. The gel content refers to the amount determined as a matter insoluble in toluene that is a non-polar solvent. Hereinafter, this content is also referred to simply as "gel content" or "gel fraction". The gel content is determined by the following method. First, a natural rubber sample is immersed in dehydrated toluene and is allowed to stand for one week in a dark place protected from light. Next, the toluene solution is centrifuged for 30 minutes at $1.3 \times 10^5$ rpm so that a toluene-insoluble gel fraction and a toluene-soluble fraction are separated from each other. The toluene-insoluble gel fraction is added with methanol to be solidified, and is then dried. Finally, the gel content can be determined from the ratio of the mass of the dried gel fraction to the mass of the original sample.

The modified natural rubber may be produced by a method in which natural rubber latex is saponified with an alkali, a rubber coagulated therefrom after the saponification is washed, and then the washed rubber is dried. The saponification is performed by adding an alkali and optionally a surfactant to natural rubber latex and allowing the mixture to stand for a certain period at a predetermined temperature. Here, the mixture may optionally be stirred or subjected to other operations. The production method removes phosphorus compounds, which are separated in the saponification, by washing, and thereby can reduce the phosphorus content in natural rubber. Further, the saponification degrades proteins in natural rubber, and thereby can reduce the nitrogen content in natural rubber. In the present invention, the saponification can be performed by adding an alkali to natural rubber latex, and the addition to natural rubber latex advantageously leads to efficient saponification.

Natural rubber latex is sap extracted from hevea trees and contains components such as water, proteins, lipids, and inorganic salts as well as a rubber component. The gel fraction in rubber is thought to be derived from a complex of various impurities in rubber. The latex used in the present invention may be raw latex taken from hevea trees by tapping the trees, or purified latex concentrated by centrifugation. Alternatively, high ammonia latex may be used which is produced by adding ammonia to raw rubber latex through a common method so as to inhibit the corruption of raw rubber latex due to bacteria existing in the latex and to prevent coagulation of the latex.

Examples of the alkali used in the saponification include sodium hydroxide, potassium hydroxide, calcium hydroxide, and amine compounds. Among these, sodium hydroxide and potassium hydroxide are particularly preferable for good saponifying effect and stability of natural rubber latex.

The addition amount of the alkali is not particularly limited. The lower limit thereof is preferably 0.1 parts by mass or higher, and more preferably 0.3 parts by mass or higher, per 100 parts by mass of the solids in natural rubber latex. The upper limit thereof is preferably 12 parts by mass or lower, more preferably 10 parts by mass or lower, and still more preferably 7 parts by mass or lower, per 100 parts by mass of the solids in natural rubber latex. An addition amount of the alkali of less than 0.1 parts by mass may cause a long-time saponification. On the other hand, an addition amount of the alkali of more than 12 parts by mass may destabilize natural rubber latex.

The surfactant to be used may be an anionic surfactant, a nonionic surfactant, or an ampholytic surfactant. Examples of the anionic surfactant include carboxylic acid anionic surfactants, sulfonic acid anionic surfactants, sulfate anionic surfactants, and phosphate anionic surfactants. Examples of the nonionic surfactant include polyoxyalkylene ether nonionic surfactants, polyoxyalkylene ester nonionic surfactants, polyhydric alcohol fatty acid ester nonionic surfactants, sugar fatty acid ester nonionic surfactants, and alkylpolyglycoside nonionic surfactants. Examples of the ampholytic surfactant include amino acid ampholytic surfactants, betaine ampholytic surfactants, and amine oxide ampholytic surfactants.

The lower limit of the addition amount of the surfactant is preferably 0.01 parts by mass or higher, and more preferably 0.1 parts by mass or higher, per 100 parts by mass of the solids in natural rubber latex. The upper limit thereof is preferably 6 parts by mass or lower, more preferably 5 parts by mass or lower, still more preferably 3.5 parts by mass or lower, and particularly preferably 3 parts by mass or lower, per 100 parts by mass of the solids in natural rubber latex. An addition amount of the surfactant of less than 0.01 parts by mass may cause destabilization of natural rubber latex during the saponification. On the other hand, an addition amount of the surfactant of more than 6 parts by mass may excessively stabilize natural rubber latex, which may make it difficult for the natural rubber latex to coagulate.

The temperature during the saponification can be appropriately set within a range that allows the saponification with an alkali to proceed at a sufficient reaction rate, and within a range that does not cause natural rubber latex to be subjected to denaturation such as coagulation. Generally, the temperature during the saponification is preferably 20° C. to 70° C., and more preferably 30° C. to 70° C. Although it depends on the temperature during the saponification, the time period of the saponification, in the case of allowing natural rubber latex to stand statically, is preferably 3 to 48 hours, and more preferably 3 to 24 hours for sufficient saponification and improvement of productivity.

After the saponification, coagulation is performed and the coagulated rubber is broken up and then washed. Examples of the coagulation method include a method in which an acid such as formic acid is added to latex so as to adjust the pH of the latex. Examples of the washing method include a method in which the coagulated rubber is diluted with water for washing, and the mixture is centrifuged to extract the rubber. Before the centrifugation, the dilution with water is first performed so that the content of the rubber formed from natural rubber latex is 5 to 40% by mass, and preferably 10 to 30% by mass. Next, the diluted rubber mixture may be centrifuged for 1 to 60 minutes at 5000 to 10000 rpm. After the completion of washing, a saponification-treated natural rubber latex can be produced. Then, the saponification-treated natural rubber latex is dried to provide the modified natural rubber of the present invention.

In the production method, the saponification, washing, and drying are preferably completed within 15 days after natural rubber latex is extracted. Further, it is more preferable to complete the saponification, washing, and drying within 10 days, and still more preferably within 5 days after the latex is extracted. This is because the gel content increases if the latex is left to stand for more than 15 days without being solidified after extraction.

In the rubber composition for a sidewall of the present invention, the amount of the modified natural rubber in 100% by mass of the rubber component is preferably 5% by mass or more, and more preferably 10% by mass or more. An amount of the modified natural rubber of less than 5% by mass may cause failure to achieve excellent fuel economy (low heat build-up). The amount of the modified natural rubber in 100% by mass of the rubber component is preferably 60% by mass or less, more preferably 40% by mass or less, and still more preferably 20% by mass or less. An amount of the modified natural rubber of more than 60% by mass may cause failure to achieve high flex crack growth resistance.

In the rubber composition for an insulation of the present invention, the amount of the modified natural rubber in 100% by mass of the rubber component is 15% by mass or more, preferably 20% by mass or more, more preferably 40% by mass or more, and still more preferably 60% by mass or more. An amount of the modified natural rubber of less than 15% by mass may cause failure to achieve excellent fuel economy (low heat build-up). The amount of the modified natural rubber in 100% by mass of the rubber component is 95% by mass or less, preferably 90% by mass or less, and more preferably 85% by mass or less. An amount of the modified natural rubber of more than 95% by mass may cause failure to achieve high flex crack growth resistance.

In the rubber composition for a breaker cushion of the present invention, the amount of the modified natural rubber in 100% by mass of the rubber component is 10% by mass or more, preferably 20% by mass or more, more preferably 30% by mass or more, and still more preferably 40% by mass or more. An amount of the modified natural rubber of less than 10% by mass may cause failure to achieve excellent fuel economy (low heat build-up). The amount of the modified natural rubber in 100% by mass of the rubber component is 90% by mass or less, preferably 60% by mass or less, and more preferably 50% by mass or less. An amount of the modified natural rubber of more than 90% by mass may cause failure to achieve high flex crack growth resistance.

Examples of rubbers that may be used in the present invention other than HPNR include natural rubber (NR), isoprene rubber (IR), butadiene rubber (BR), styrene-butadiene rubber (SBR), acrylonitrile-butadiene rubber (NBR), chloroprene rubber (CR), and butyl rubber (IIR). Each of these may be used alone or two or more of these may be used in combination.

BR is particularly preferable if the rubber composition of the present invention is for a sidewall or a breaker cushion because BR is excellent in flex crack growth resistance. On the other hand, SBR is preferable if the rubber composition of the present invention is for an insulation because SBR is excellent in molding processability.

BR is not particularly limited. Examples thereof include high cis-content BRs such as BR1220 (ZEON Corp.) and BR130B and BR150B (Ube Industries, Ltd.), and syndiotactic polybutadiene crystal-containing BRs such as VCR412 and VCR617 (Ube Industries, Ltd.). In particular, the cis content of BR is preferably 70% by mass or higher because such a high cis content leads to excellent fuel economy and processability.

In the case that the rubber composition for a sidewall of the present invention contains BR, the BR content in 100% by mass of the rubber component is preferably 40% by mass or more, more preferably 50% by mass or more, and still more preferably 60% by mass or more. A BR content of less than 40% by mass may cause failure to achieve high flex crack growth resistance. The BR content in 100% by mass of the rubber component is preferably 95% by mass or less, and more preferably 90% by mass or less. A BR content of more than 95% by mass may cause failure to achieve excellent fuel economy (low heat build-up).

In the case that the rubber composition for a breaker cushion of the present invention contains BR, the BR content in 100% by mass of the rubber component is preferably 10% by mass or more, more preferably 20% by mass or more, and still more preferably 40% by mass or more. A BR content of less than 10% by mass may cause failure to achieve high flex crack growth resistance. The BR content in 100% by mass of the rubber component is preferably 90% by mass or less, more preferably 80% by mass or less, and still more preferably 70% by mass or less. A BR content of more than 90% by mass may cause failure to achieve excellent fuel economy (low heat build-up).

SBR is not particularly limited. Examples thereof include emulsion-polymerized styrene-butadiene rubber (E-SBR) and solution-polymerized styrene-butadiene rubber (S-SBR).

The styrene content in SBR is preferably 5% by mass or more, and more preferably 10% by mass or more. A styrene content of less than 5% by mass may cause reduction in processability. The styrene content is preferably 50% by mass or less, more preferably 45% by mass or less, still more preferably 40% by mass or less, and particularly preferably 30% by mass or less. A styrene content of more than 50% by mass may cause failure to achieve excellent fuel economy.

Here, the styrene content in SBR is determined by $^1$H-NMR.

In the case that the rubber composition for an insulation of the present invention contains SBR, the SBR content in 100% by mass of the rubber component is preferably 5% by mass or more, more preferably 10% by mass or more, and still more preferably 30% by mass or more. An SBR content of less than 5% by mass may cause failure to achieve high flex crack growth resistance. The SBR content in 100% by mass of the rubber component is preferably 85% by mass or less, more preferably 80% by mass or less, and still more preferably 75% by mass or less. An SBR content of more than 85% by mass may cause failure to achieve excellent fuel economy (low heat build-up).

Examples of the carbon black include, but not particularly limited to, GPF, FEF, HAF, ISAF, and SAF. The carbon black gives reinforcement to the rubber composition, and thereby the resulting composition can have favorable flex crack growth resistance. Accordingly, use of the carbon black in combination with HPNR favorably achieves the effects of the present invention.

In the case of the rubber composition for a sidewall or a breaker cushion of the present invention, the nitrogen adsorption specific surface area ($N_2SA$) of the carbon black is preferably 10 $m^2/g$ or larger, more preferably 20 $m^2/g$ or larger, and still more preferably 40 $m^2/g$ or larger. An $N_2SA$ of smaller than 10 $m^2/g$ may result in deterioration of processability and insufficient tensile strength. Also, the nitrogen adsorption specific surface area of the carbon black is preferably 150 $m^2/g$ or smaller, more preferably 80 $m^2/g$ or smaller, and still more preferably 50 $m^2/g$ or smaller. An $N_2SA$ of larger than 150 $m^2/g$ tends to cause difficulty in favorably dispersing the carbon black.

The nitrogen adsorption specific surface area of the carbon black herein is determined by the method A described in JIS K6217.

In the case of the rubber composition for an insulation of the present invention, the nitrogen adsorption specific surface area ($N_2SA$) of the carbon black is preferably 10 $m^2/g$ or larger, more preferably 20 $m^2/g$ or larger, and still more preferably 25 $m^2/g$ or larger. An $N_2SA$ of smaller than 10 $m^2/g$ may result in deterioration of processability and insufficient tensile strength. Also, the nitrogen adsorption specific surface area of the carbon black is preferably 150 $m^2/g$ or smaller, more preferably 80 $m^2/g$ or smaller, still more preferably 50 $m^2/g$ or smaller, and particularly preferably 30 $m^2/g$ or smaller. An $N_2SA$ of larger than 150 $m^2/g$ tends to cause difficulty in favorably dispersing the carbon black.

In the case that the rubber composition of the present invention contains the carbon black, the amount of the carbon black is preferably 5 parts by mass or more, more preferably 10 parts by mass or more, still more preferably 20 parts by mass or more, particularly preferably 30 parts by mass or more, and most preferably 40 parts by mass or more, per 100 parts by mass of the rubber component. An amount of the carbon black of less than 5 parts by mass may result in insufficient rubber physical properties. In addition, if the white filler is not used together, the effect of improving flex crack growth resistance owing to HPNR addition may be insufficiently achieved. The amount of the carbon black is preferably 100 parts by mass or less, more preferably 80 parts by mass or less, and still more preferably 70 parts by mass or less, per 100 parts by mass of the rubber component. An amount of the carbon black of more than 100 parts by mass tends to cause deterioration in dispersibility and processability.

The white filler may be one generally used in the rubber industry, including silica, calcium carbonate, mica such as sericite, aluminum hydroxide, magnesium oxide, magnesium hydroxide, clay, talc, alumina, or titanium oxide. If the white filler is added, the effect of improving fuel economy owing to HPNR addition is enhanced. Preferable among the above white fillers is silica in terms of fuel economy and rubber strength.

The silica is not particularly limited. Examples thereof include silica produced through a dry process (anhydrous silicic acid) and/or silica produced through a wet process (hydrous silicic acid). Preferable among these is silica produced through a wet process (hydrous silicic acid) because such silica contains a large number of silanol groups.

The nitrogen adsorption specific surface area ($N_2SA$) of the silica is preferably 30 $m^2/g$ or larger, more preferably 60 $m^2/g$ or larger, and still more preferably 100 $m^2/g$ or larger. An $N_2SA$ of smaller than 30 $m^2/g$ tends to cause a decrease in tensile strength (flex crack growth resistance) of the vulcanized rubber composition. The $N_2SA$ of the silica is preferably 200 $m^2/g$ or smaller, more preferably 150 $m^2/g$ or smaller, and still more preferably 120 $m^2/g$ or smaller. An $N_2SA$ of larger than 200 $m^2/g$ tends to cause deterioration in processability.

Here, the nitrogen adsorption specific surface area of the silica is a value determined by the BET method in accordance with ASTM D3037-81.

In the case that the rubber composition of the present invention contains the silica, the amount of the silica is preferably 5 parts by mass or more, more preferably 10 parts by mass or more, and still more preferably 30 parts by mass or more, per 100 parts by mass of the rubber component. An amount of the silica of less than 5 parts by mass may result in insufficient fuel economy. Also, the amount of the silica is preferably 100 parts by mass or less, and more preferably 80 parts by mass or less, per 100 parts by mass of the rubber component. An amount of the silica of more than 100 parts by mass tends to cause deterioration in processability.

The rubber composition of the present invention preferably contains a silane coupling agent together with the silica. Examples thereof include sulfide-type silane coupling agents, mercapto-type silane coupling agents, vinyl-type silane coupling agents, amino-type silane coupling agents, glycidoxy-type silane coupling agents, nitro-type silane coupling agents, and chloro-type silane coupling agents. Preferable among these are sulfide-type silane coupling agents such as bis(3-triethoxysilylpropyl)tetrasulfide, bis(2-triethoxysilylethyl) tetrasulfide, bis(3-triethoxysilylpropyl)disulfide, and bis(2-triethoxysilylethyl)disulfide. Particularly preferable is bis(3-triethoxysilylpropyl)disulfide.

In the case that the rubber composition contains a silane coupling agent, the amount of the silane coupling agent is preferably 2 parts by mass or more, and more preferably 4 parts by mass or more, per 100 parts by mass of the silica. An amount of the silane coupling agent of less than 2 parts by mass may result in insufficient dispersion of the silica and therefore insufficient rubber physical properties.

Also, the amount of the silane coupling agent is preferably 15 parts by mass or less, and more preferably 12 parts by mass or less, per 100 parts by mass of the silica. An amount of the silane coupling agent of more than 15 parts by mass may cause deterioration in dispersibility and processability.

In the rubber composition of the present invention, the total amount of the carbon black and the white filler is preferably 10 parts by mass or more, more preferably 20 parts by mass or more, still more preferably 30 parts by mass or more, particularly preferably 40 parts by mass or more, and most preferably 50 parts by mass or more, per 100 parts by mass of the rubber component. A total amount of less than 10 parts by mass may lead to insufficient rubber physical properties. In addition, the effects owing to HPNR addition may not be sufficiently obtained.

Also, the total amount of the carbon black and the white filler is preferably 150 parts by mass or less, more preferably 120 parts by mass or less, and still more preferably 100 parts by mass or less, per 100 parts by mass of the rubber component. A total amount of more than 150 parts by mass may cause deterioration in processability and may lead to insufficiently low heat build-up.

The rubber composition of the present invention optionally contains compounding ingredients generally used in production of rubber compositions, in addition to the ingredients described above. Examples of the compounding ingredients include zinc oxide, stearic acid, various age resistors, oils such as aromatic oils, waxes, vulcanizing agents, and vulcanization accelerators.

The rubber composition of the present invention is produced by a common method. Specifically, for example, the respective ingredients described above are mixed with an apparatus such as a Banbury mixer, a kneader, or an open roll mill, and are then vulcanized, whereby a rubber composition is produced. In the case of producing a rubber composition containing natural rubber, the natural rubber is generally masticated before the mixing of the respective ingredients such as a rubber component and a filler. According to the present invention in which a modified natural rubber is used, if the rubber composition contains no (unmodified) natural rubber, the mixing can be carried out well without the mastication, so that a desired rubber composition is produced.

The rubber composition for an insulation of the present invention is used for an insulation disposed between a carcass and an inner liner. Specifically, this rubber composition is used for tire components such as those disclosed in FIGS. 1 and 2 of JP 2008-150523 A.

The rubber composition for a breaker cushion of the present invention is used for a layer called a breaker cushion that is disposed between the edge portion of a breaker and a casing. Specifically, this rubber composition is used for layers (tire components) such as those disclosed in FIG. 1 of JP 2006-273934 A and FIG. 1 of JP 2004-161862 A.

The pneumatic tire of the present invention is produced using the rubber composition mentioned above by a common method. Specifically, an unvulcanized rubber composition with the additives optionally blended therein is extruded and processed into the shape of a sidewall, an insulation, and/or a breaker cushion of a tire, and then assembled with other tire components and molded in a usual manner on a tire building machine to provide an unvulcanized tire. This unvulcanized tire is then heated and pressed in a vulcanizer, and thereby a tire is produced.

The tire including a sidewall, an insulation, and/or a breaker cushion produced from the rubber compositions of the present invention is particularly suitably used for passenger vehicles, trucks and busses, motorcycles (autobicycles), and the like.

EXAMPLES

The following will specifically describe the present invention with reference to, but not limited to, examples.

The respective chemical agents and the like used in the examples are listed below.
Natural rubber latex: field latex (Thaitex)
Saponified natural rubber A: see the following Preparation 1
Saponified natural rubber B: see the following Preparation 2
Untreated natural rubber: see the following Preparation 3
TSR: natural rubber (TSR)
BR: UBEPOL BR150B (cis content: 97% by mass, Ube Industries, Ltd.)
SBR: Nipol 1502 (E-SBR, styrene content: 23.5% by mass, ZEON Corp.)
Carbon black A: FEF (N550, $N_2SA$: 45 $m^2/g$, Tokai Carbon Co., Ltd.)
Carbon black B: SEAST V (N660, $N_2SA$: 27 $m^2/g$, Tokai Carbon Co., Ltd.)
Silica: Silica 115Gr ($N_2SA$: 110 $m^2/g$, Rhodia Japan Ltd.)
Silane coupling agent: Si266 (bis(3-triethoxysilylpropyl) disulfide, Degussa AG)
Oil: Process X-140 (aromatic oil, Japan Energy Corp.)
Wax: SUNNOC N (Ouchi Shinko Chemical Industrial Co., Ltd.)
Zinc oxide: Zinc white #1 (Mitsui Mining & Smelting Co., Ltd.)
Stearic acid: Stearic acid "TSUBAKI" (NOF Corp.)
Age resistor A: NOCRAC 6C(N-(1,3-dimethylbutyl)-N'-phenyl-p-phenylenediamine, Ouchi Shinko Chemical Industrial Co., Ltd.)
Age resistor B: Antage RD (polymerized 2,2,4-trimethyl-1,2-dihydroquinoline, Kawaguchi Chemical Industry Co., Ltd.)
Sulfur: sulfur powder (Tsurumi Chemical Industry Co., Ltd.)
Vulcanization accelerator: NOCCELER CZ (Ouchi Shinko Chemical Industrial Co., Ltd.)
Surfactant: Emal-E (Kao Corp.)
NaOH: NaOH (Wako Pure Chemical Industries, Ltd.)
(Production of Natural Rubber Saponified with Alkali)
Preparation 1

The solids content (DRC) of natural rubber latex was adjusted to 30% (w/v). Next, the natural rubber latex (1000 g) was mixed with Emal-E (10 g) and NaOH (20 g), and then saponified for 48 hours at room temperature. Thereby, a saponified natural rubber latex was produced. The saponified latex was mixed with water to be diluted to a DRC of 15% (w/v). Then, formic acid was added to the diluted latex while being slowly stirred, so that the pH was adjusted to 4.0 to 4.5. The latex was coagulated, and the coagulated rubber was broken up and repeatedly washed with 1000 ml of water. Then, the rubber was dried for 2 hours at 110° C. Thereby, a solid rubber (saponified natural rubber A) was produced.
Preparation 2

The solids content (DRC) of natural rubber latex was adjusted to 30% (w/v). Next, the natural rubber latex (1000 g) was mixed with Emal-E (10 g) and NaOH (15 g), and then saponified for 48 hours at room temperature. Thereby, a saponified natural rubber latex was produced. The saponified latex was mixed with water to be diluted to a DRC of 15% (w/v). Then, formic acid was added to the diluted latex while being slowly stirred, so that the pH was adjusted to 4.0 to 4.5. The latex was coagulated, and the coagulated rubber was broken up and repeatedly washed with 1000 ml of water. Then, the rubber was dried for 2 hours at 110° C. Thereby, a solid rubber (saponified natural rubber B) was produced.
Preparation 3

The solids content (DRC) of natural rubber latex was adjusted to 30% (w/v). Next, formic acid was added to the natural rubber latex while being slowly stirred, so that the pH was adjusted to 4.0 to 4.5. The rubber was coagulated, and the coagulated rubber was broken up and dried for 2 hours at 110° C. Thereby, a solid rubber (untreated natural rubber) was produced.

TSR and the solid rubbers produced in Preparations 1 to 3 were determined for nitrogen content, phosphorus content, and gel content by the following methods. Table 1 shows the results.
(Determination of Nitrogen Content)

The nitrogen content was determined with CHN CORDER MT-5 (Yanaco Analytical Instruments Corp.). In the determination, first, a calibration curve for determining the nitrogen content was prepared with antipyrin taken as a reference material. Then, about 10 mg of TSR or the natural rubber produced in each Preparation was weighed out and determined three times. The average value was calculated and regarded as the nitrogen content of the sample.
(Determination of Phosphorus Content)

The phosphorus content was determined with an ICP emission spectrometer (ICPS-8100, produced by Shimadzu Corp.).
(Determination of Gel Content)

Each of raw rubber samples cut in a size of 1 mm×1 mm was weighed out (70.00 mg), mixed with 35 mL of toluene, and allowed to stand for 1 week in a cool and dark place. Next, the mixture was centrifuged so that a toluene-insoluble gel fraction was precipitated, and a toluene-soluble supernatant was removed. Then, the gel fraction alone was solidified with methanol and dried. The mass of the dried gel fraction was measured, and then used in the following formula to determine the gel content (%).

Gel content (% by mass)=[Mass of dried gel fraction (mg)/Mass of original sample (mg)]×100

TABLE 1

|  | Saponified natural rubber A (Preparation 1) | Saponified natural rubber B (Preparation 2) | Untreated natural rubber (Preparation 3) | TSR |
|---|---|---|---|---|
| Nitrogen content (% by mass) | 0.12 | 0.25 | 0.32 | 0.33 |
| Phosphorus content (ppm) | 84 | 123 | 359 | 572 |
| Gel content (% by mass) | 5.5 | 14.2 | 25.3 | 26.9 |

As shown in Table 1, the saponified natural rubbers A and B, compared with the untreated natural rubber and TSR, were found to have a decreased nitrogen content, phosphorus content, and gel content.

Examples 1 to 29 and Comparative Examples 1 to 30

Production of Unvulcanized Rubber Composition and Vulcanized Rubber Composition

In accordance with each formulation shown in Tables 2 to 10, the chemical agents other than the sulfur and the vulcanization accelerator were mixed with a 1.7-L Banbury mixer. Next, the sulfur and the vulcanization accelerator were added to the resultant mixture, and they were mixed with an open roll mill. Thereby, an unvulcanized rubber composition was produced. In Comparative Examples 1, 3, 5, 7, 11, 15, 19, 23, and 27 in which TSR was used, a peptizer was added in an amount of 0.4 parts by mass per 100 parts by mass of the rubber component of the TSR, and the mixture was masticated beforehand with the 1.7-L Banbury mixer. On the other hand, the natural rubbers in Examples 1 to 29 and Comparative Examples 2, 4, 6, 8 to 10, 12 to 14, 16 to 18, to 22, 24 to 26, and 28 to 30 were not masticated.

Next, the unvulcanized rubber composition thereby produced was press-vulcanized in a 2-mm-thick mold for 15 minutes at 170° C., whereby a vulcanized rubber composition (vulcanized rubber sheet) was produced.

The produced unvulcanized rubber compositions and vulcanized rubber compositions were evaluated in the following ways. Tables 2 to 10 show the evaluation results. Here, the standard comparative example in Table 2 is Comparative Example 1; the standard comparative example in Table 3 is Comparative Example 3; the standard comparative example in Table 4 is Comparative Example 5; the standard comparative example in Table 5 is Comparative Example 7; the standard comparative example in Table 6 is Comparative Example 11; the standard comparative example in Table 7 is Comparative Example 15; the standard comparative example in Table 8 is Comparative Example 19; the standard comparative example in Table 9 is Comparative Example 23; and the standard comparative example in Table 10 is Comparative Example 27.
(Determination of Mooney Viscosity)

The produced unvulcanized rubber compositions were measured for Mooney viscosity at 130° C. in accordance with the method of determining Mooney viscosity specified in JIS K6300. The Mooney viscosity ($ML_{1+4}$) of each unvulcanized rubber composition was expressed as an index based on the Mooney viscosity of each standard comparative example being 100. The larger the index is, the lower the Mooney viscosity is and the better the processability is.
(Low Heat Build-Up, tan δ)

The vulcanized rubber sheets were measured for loss tangent, tan δ, at 70° C. with a viscoelasticity spectrometer (Iwamoto Seisakusho Co., Ltd.) under the following conditions: a frequency of 10 Hz; an initial strain of 10%; and a dynamic strain of 2%. The smaller the tan δ is, the less the heat is generated, the lower the heat build-up is, and thus the more the rolling resistance is decreased. The inverse of the tan δ of each vulcanized rubber sheet was expressed as an index based on the inverse of the tan δ of each standard comparative example being 100. The larger the index is, the smaller the tan δ is and the better the low heat build-up (fuel economy) is.
(Flex Crack Growth Resistance Test)

A sample prepared from each of the vulcanized rubber sheets was subjected to a flex crack growth test in accordance with JIS K6260 "Testing method of flex cracking and crack growth for rubber, vulcanized or thermoplastic (De Mattia)". In the test, the rubber sheet sample was flexed at 70% elongation repeatedly 1,000,000 times, and then the length of a generated crack was measured. The inverse of the measured value (length) of each sample was expressed as an index based on the inverse of the measured value of each standard comparative example being 100. The larger the index is, the more the crack growth is suppressed and the better the flex crack growth resistance is.

TABLE 2

(Rubber composition for sidewall, carbon black blended (50 parts))

|  | Comparative Example 1 | Example 1 | Example 2 | Example 3 | Comparative Example 2 |
|---|---|---|---|---|---|
| Saponified natural rubber A (Preparation 1) | — | 10 | — | 40 | — |
| Saponified natural rubber B (Preparation 2) | — | — | 10 | — | — |
| Untreated natural rubber (Preparation 3) | — | — | — | — | 10 |

TABLE 2-continued (Rubber composition for sidewall, carbon black blended (50 parts))

| | Comparative Example 1 | Example 1 | Example 2 | Example 3 | Comparative Example 2 |
|---|---|---|---|---|---|
| TSR | 40 | — | — | — | — |
| BR | 60 | 90 | 90 | 60 | 90 |
| Carbon black A | 50 | 50 | 50 | 50 | 50 |
| Oil | 5 | 5 | 5 | 5 | 5 |
| Wax | 1 | 1 | 1 | 1 | 1 |
| Age resistor A | 2 | 2 | 2 | 2 | 2 |
| Age resistor B | 1 | 1 | 1 | 1 | 1 |
| Zinc oxide | 4 | 4 | 4 | 4 | 4 |
| Stearic acid | 2 | 2 | 2 | 2 | 2 |
| Sulfur | 3 | 3 | 3 | 3 | 3 |
| Valucanization accelerator | 1 | 1 | 1 | 1 | 1 |
| Mooney viscosity (index) | 100 | 110 | 109 | 115 | 85 |
| Low heat build-up (tan δ) (index) | 100 | 115 | 113 | 105 | 95 |
| Flex crack growth resistance (index) | 100 | 131 | 130 | 110 | 105 |

TABLE 3

(Rubber composition for sidewall, carbon black blended (20 parts))

| | Comparative Example 3 | Example 4 | Example 5 | Example 6 | Comparative Example 4 |
|---|---|---|---|---|---|
| Saponified natural rubber A (Preparation 1) | — | 10 | — | 40 | — |
| Saponified natural rubber B (Preparation 2) | — | — | 10 | — | — |
| Untreated natural rubber (Preparation 3) | — | — | — | — | 10 |
| TSR | 40 | — | — | — | — |
| BR | 60 | 90 | 90 | 60 | 90 |
| Carbon black A | 20 | 20 | 20 | 20 | 20 |
| Oil | 5 | 5 | 5 | 5 | 5 |
| Wax | 1 | 1 | 1 | 1 | 1 |
| Age resistor A | 2 | 2 | 2 | 2 | 2 |
| Age resistor B | 1 | 1 | 1 | 1 | 1 |
| Zinc oxide | 4 | 4 | 4 | 4 | 4 |
| Stearic acid | 2 | 2 | 2 | 2 | 2 |
| Sulfur | 3 | 3 | 3 | 3 | 3 |
| Valucanization accelerator | 1 | 1 | 1 | 1 | 1 |
| Mooney viscosity (index) | 100 | 108 | 106 | 113 | 90 |
| Low heat build-up (tan δ) (index) | 100 | 118 | 115 | 108 | 97 |
| Flex crack growth resistance (index) | 100 | 115 | 113 | 105 | 95 |

As shown in Table 2, the rubber compositions with carbon black (50 parts by mass) blended therein favorably achieved both low heat build-up (fuel economy) and flex crack growth resistance in the Examples in which a saponified natural rubber (modified natural rubber) was used as the rubber component, compared with in the Comparative Examples in which no modified natural rubber was used. Further, the rubber compositions in the Examples had improved processability compared with in the Comparative Examples.

As shown in Table 3, the rubber compositions with carbon black (20 parts by mass) blended therein also had the same tendency as in Table 2. The results in Tables 2 and 3 show that the larger the amount of carbon black is, the greater the effect of improving flex crack growth resistance owing to addition of a modified natural rubber is.

TABLE 4

(Rubber composition for sidewall, silica blended)

| | Comparative Example 5 | Example 7 | Example 8 | Example 9 | Comparative Example 6 |
|---|---|---|---|---|---|
| Saponified natural rubber A (Preparation 1) | — | 10 | — | 40 | — |
| Saponified natural rubber B (Preparation 2) | — | — | 10 | — | — |
| Untreated natural rubber (Preparation 3) | — | — | — | — | 10 |

TABLE 4-continued (Rubber composition for sidewall, silica blended)

|  | Comparative Example 5 | Example 7 | Example 8 | Example 9 | Comparative Example 6 |
|---|---|---|---|---|---|
| TSR | 40 | — | — | — | — |
| BR | 60 | 90 | 90 | 60 | 90 |
| Silica | 50 | 50 | 50 | 50 | 50 |
| Silane coupling agent | 4 | 4 | 4 | 4 | 4 |
| Oil | 5 | 5 | 5 | 5 | 5 |
| Wax | 1 | 1 | 1 | 1 | 1 |
| Age resistor A | 2 | 2 | 2 | 2 | 2 |
| Age resistor B | 1 | 1 | 1 | 1 | 1 |
| Zinc oxide | 4 | 4 | 4 | 4 | 4 |
| Stearic acid | 2 | 2 | 2 | 2 | 2 |
| Sulfur | 3 | 3 | 3 | 3 | 3 |
| Valucanization accelerator | 1 | 1 | 1 | 1 | 1 |
| Mooney viscosity (index) | 100 | 110 | 109 | 103 | 90 |
| Low heat build-up (tan δ) (index) | 100 | 125 | 123 | 115 | 96 |
| Flex crack growth resistance (index) | 100 | 118 | 117 | 111 | 97 |

Table 4 shows that the rubber compositions with silica blended therein also provided the same improving effects as those with carbon black blended therein (Tables 2 and 3). The effect of reducing heat build-up owing to addition of a modified natural rubber was greater in the case of silica addition than in the case of carbon black addition.

TABLE 5

(Rubber composition for insulation, carbon black blended (60 parts))

|  | Comparative Example 7 | Example 10 | Example 11 | Example 12 | Comparative Example 8 | Comparative Example 9 | Comparative Example 10 | Example 13 |
|---|---|---|---|---|---|---|---|---|
| Saponified natural rubber A (Preparation 1) | — | 30 | — | 65 | — | 10 | 100 | 80 |
| Saponified natural rubber B (Preparation 2) | — | — | 30 | — | — | — | — | — |
| Untreated natural rubber (Preparation 3) | — | — | — | — | 30 | — | — | — |
| TSR | 65 | — | — | — | — | — | — | — |
| SBR | 35 | 70 | 70 | 35 | 70 | 90 | — | 20 |
| Carbon black B | 60 | 60 | 60 | 60 | 60 | 60 | 60 | 60 |
| Oil | 8 | 8 | 8 | 8 | 8 | 8 | 8 | 8 |
| Zinc oxide | 3 | 3 | 3 | 3 | 3 | 3 | 3 | 3 |
| Stearic acid | 2 | 2 | 2 | 2 | 2 | 2 | 2 | 2 |
| Sulfur | 1.5 | 1.5 | 1.5 | 1.5 | 1.5 | 1.5 | 1.5 | 1.5 |
| Valucanization accelerator | 1 | 1 | 1 | 1 | 1 | 1 | 1 | 1 |
| Mooney viscosity (index) | 100 | 110 | 109 | 115 | 85 | 85 | 110 | 117 |
| Low heat build-up (tan δ) (index) | 100 | 115 | 113 | 110 | 95 | 95 | 102 | 108 |
| Flex crack growth resistance (index) | 100 | 105 | 110 | 130 | 105 | 90 | 90 | 140 |

TABLE 6

(Rubber composition for insulation, carbon black blended (20 parts))

|  | Comparative Example 11 | Example 14 | Example 15 | Example 16 | Comparative Example 12 | Comparative Example 13 | Comparative Example 14 |
|---|---|---|---|---|---|---|---|
| Saponified natural rubber A (Preparation 1) | — | 30 | — | 65 | — | 10 | 100 |
| Saponified natural rubber B (Preparation 2) | — | — | 30 | — | — | — | — |
| Untreated natural rubber (Preparation 3) | — | — | — | — | 30 | — | — |
| TSR | 65 | — | — | — | — | — | — |
| SBR | 35 | 70 | 70 | 35 | 70 | 90 | — |
| Carbon black B | 20 | 20 | 20 | 20 | 20 | 20 | 20 |
| Oil | 8 | 8 | 8 | 8 | 8 | 8 | 8 |
| Zinc oxide | 3 | 3 | 3 | 3 | 3 | 3 | 3 |
| Stearic acid | 2 | 2 | 2 | 2 | 2 | 2 | 2 |
| Sulfur | 1.5 | 1.5 | 1.5 | 1.5 | 1.5 | 1.5 | 1.5 |
| Valucanization accelerator | 1 | 1 | 1 | 1 | 1 | 1 | 1 |

TABLE 6-continued (Rubber composition for insulation, carbon black blended (20 parts))

|  | Comparative Example 11 | Example 14 | Example 15 | Example 16 | Comparative Example 12 | Comparative Example 13 | Comparative Example 14 |
|---|---|---|---|---|---|---|---|
| Mooney viscosity (index) | 100 | 108 | 110 | 118 | 87 | 88 | 112 |
| Low heat build-up (tan δ) (index) | 100 | 113 | 114 | 115 | 98 | 97 | 103 |
| Flex crack growth resistance (index) | 100 | 100 | 98 | 124 | 100 | 88 | 84 |

As shown in Table 5, the rubber compositions with carbon black (60 parts by mass) blended therein favorably achieved both low heat build-up (fuel economy) and flex crack growth resistance in the Examples in which a predetermined amount of a saponified natural rubber (modified natural rubber) was used as the rubber component, compared with in Comparative Examples 7 and 8 in which no modified natural rubber was used, and Comparative Examples 9 and 10 in which a modified natural rubber was used in an amount outside the predetermined amount range. Further, the rubber compositions in the Examples had improved processability compared with in the Comparative Examples.

Table 6 shows that the rubber compositions with carbon black (20 parts by mass) blended therein also had the same tendency as in Table 5. The results in Tables 5 and 6 show that the larger the amount of carbon black is, the greater the effect of improving flex crack growth resistance owing to addition of a modified natural rubber is.

TABLE 7

(Rubber composition for insulation, silica blended)

|  | Comparative Example 15 | Example 17 | Example 18 | Example 19 | Comparative Example 16 | Comparative Example 17 | Comparative Example 18 |
|---|---|---|---|---|---|---|---|
| Saponified natural rubber A (Preparation 1) | — | 30 | — | 80 | — | 10 | 100 |
| Saponified natural rubber B (Preparation 2) | — | — | 30 | — | — | — | — |
| Untreated natural rubber (Preparation 3) | — | — | — | — | 30 | — | — |
| TSR | 65 | — | — | — | — | — | — |
| SBR | 35 | 70 | 70 | 20 | 70 | 90 | — |
| Silica | 50 | 50 | 50 | 50 | 50 | 50 | 50 |
| Silane coupling agent | 4 | 4 | 4 | 4 | 4 | 4 | 4 |
| Oil | 8 | 8 | 8 | 8 | 8 | 8 | 8 |
| Zinc oxide | 3 | 3 | 3 | 3 | 3 | 3 | 3 |
| Stearic acid | 2 | 2 | 2 | 2 | 2 | 2 | 2 |
| Sulfur | 1.5 | 1.5 | 1.5 | 1.5 | 1.5 | 1.5 | 1.5 |
| Valucanization accelerator | 1 | 1 | 1 | 1 | 1 | 1 | 1 |
| Mooney viscosity (index) | 100 | 109 | 108 | 113 | 85 | 85 | 110 |
| Low heat build-up (tan δ) (index) | 100 | 109 | 105 | 103 | 95 | 95 | 102 |
| Flex crack growth resistance (index) | 100 | 105 | 110 | 130 | 105 | 90 | 90 |

Table 7 shows that the rubber compositions with silica blended therein also provided the same improving effects as those with carbon black blended therein (Tables and 6).

TABLE 8

(Rubber composition for breaker cushion, carbon black blended (50 parts))

|  | Comparative Example 19 | Example 20 | Example 21 | Example 22 | Comparative Example 20 | Comparative Example 21 | Comparative Example 22 | Example 23 |
|---|---|---|---|---|---|---|---|---|
| Saponified natural rubber A (Preparation 1) | — | 30 | — | 45 | — | 5 | 100 | 80 |
| Saponified natural rubber B (Preparation 2) | — | — | 30 | — | — | — | — | — |
| Untreated natural rubber (Preparation 3) | — | — | — | — | 30 | — | — | — |
| TSR | 45 | — | — | — | — | — | — | — |
| BR | 55 | 70 | 70 | 55 | 70 | 95 | — | 20 |
| Carbon black A | 50 | 50 | 50 | 50 | 50 | 50 | 50 | 50 |
| Oil | 8 | 8 | 8 | 8 | 8 | 8 | 8 | 8 |
| Age resistor A | 3 | 3 | 3 | 3 | 3 | 3 | 3 | 3 |
| Zinc oxide | 3 | 3 | 3 | 3 | 3 | 3 | 3 | 3 |
| Stearic acid | 2 | 2 | 2 | 2 | 2 | 2 | 2 | 2 |

TABLE 8-continued (Rubber composition for breaker cushion, carbon black blended (50 parts))

| | Comparative Example 19 | Example 20 | Example 21 | Example 22 | Comparative Example 20 | Comparative Example 21 | Comparative Example 22 | Example 23 |
|---|---|---|---|---|---|---|---|---|
| Sulfur | 1.5 | 1.5 | 1.5 | 1.5 | 1.5 | 1.5 | 1.5 | 1.5 |
| Valucanization accelerator | 1 | 1 | 1 | 1 | 1 | 1 | 1 | 1 |
| Mooney viscosity (index) | 100 | 110 | 109 | 115 | 85 | 85 | 110 | 130 |
| Low heat build-up (tan δ) (index) | 100 | 111 | 113 | 115 | 95 | 85 | 117 | 122 |
| Flex crack growth resistance (index) | 100 | 110 | 110 | 105 | 105 | 110 | 85 | 103 |

TABLE 9

(Rubber composition for breaker cushion, carbon black blended (20 parts))

| | Comparative Example 23 | Example 24 | Example 25 | Example 26 | Comparative Example 24 | Comparative Example 25 | Comparative Example 26 |
|---|---|---|---|---|---|---|---|
| Saponified natural rubber A (Preparation 1) | — | 30 | — | 45 | — | 5 | 100 |
| Saponified natural rubber B (Preparation 2) | — | — | 30 | — | — | — | — |
| Untreated natural rubber (Preparation 3) | — | — | — | — | 30 | — | — |
| TSR | 45 | — | — | — | — | — | — |
| BR | 55 | 70 | 70 | 55 | 70 | 95 | — |
| Carbon black A | 20 | 20 | 20 | 20 | 20 | 20 | 20 |
| Oil | 8 | 8 | 8 | 8 | 8 | 8 | 8 |
| Age resistor A | 3 | 3 | 3 | 3 | 3 | 3 | 3 |
| Zinc oxide | 3 | 3 | 3 | 3 | 3 | 3 | 3 |
| Stearic acid | 2 | 2 | 2 | 2 | 2 | 2 | 2 |
| Sulfur | 1.5 | 1.5 | 1.5 | 1.5 | 1.5 | 1.5 | 1.5 |
| Valucanization accelerator | 1 | 1 | 1 | 1 | 1 | 1 | 1 |
| Mooney viscosity (index) | 100 | 112 | 111 | 118 | 87 | 85 | 112 |
| Low heat build-up (tan δ) (index) | 100 | 113 | 115 | 115 | 95 | 94 | 105 |
| Flex crack growth resistance (index) | 100 | 103 | 102 | 102 | 102 | 110 | 84 |

As shown in Table 8, the rubber compositions with carbon black (50 parts by mass) blended therein favorably achieved both low heat build-up (fuel economy) and flex crack growth resistance in the Examples in which a predetermined amount of a saponified natural rubber (modified natural rubber) was used as the rubber component, compared with in Comparative Examples 19 and 20 in which no modified natural rubber was used, and Comparative Examples 21 and 22 in which a modified natural rubber was used in an amount outside the predetermined amount range. Further, the rubber compositions in the Examples had improved processability compared with in the Comparative Examples.

Table 9 shows that the rubber compositions with carbon black (20 parts by mass) blended therein also had the same tendency as in Table 8. The results in Tables 8 and 9 show that the larger the amount of carbon black is, the greater the effect of improving flex crack growth resistance owing to addition of a modified natural rubber is.

TABLE 10

(Rubber composition for breaker cushion, silica blended)

| | Comparative Example 27 | Example 27 | Example 28 | Example 29 | Comparative Example 28 | Comparative Example 29 | Comparative Example 30 |
|---|---|---|---|---|---|---|---|
| Saponified natural rubber A (Preparation 1) | — | 30 | — | 45 | — | 5 | 100 |
| Saponified natural rubber B (Preparation 2) | — | — | 30 | — | — | — | — |
| Untreated natural rubber (Preparation 3) | — | — | — | — | 30 | — | — |
| TSR | 45 | — | — | — | — | — | — |
| BR | 55 | 70 | 70 | 55 | 70 | 95 | — |
| Silica | 40 | 40 | 40 | 40 | 40 | 40 | 40 |
| Silane coupling agent | 3.2 | 3.2 | 3.2 | 3.2 | 3.2 | 3.2 | 3.2 |
| Oil | 8 | 8 | 8 | 8 | 8 | 8 | 8 |
| Age resistor A | 3 | 3 | 3 | 3 | 3 | 3 | 3 |
| Zinc oxide | 3 | 3 | 3 | 3 | 3 | 3 | 3 |
| Stearic acid | 2 | 2 | 2 | 2 | 2 | 2 | 2 |
| Sulfur | 1.5 | 1.5 | 1.5 | 1.5 | 1.5 | 1.5 | 1.5 |

TABLE 10-continued (Rubber composition for breaker cushion, silica blended)

| | Comparative Example 27 | Example 27 | Example 28 | Example 29 | Comparative Example 28 | Comparative Example 29 | Comparative Example 30 |
|---|---|---|---|---|---|---|---|
| Valucanization accelerator | 1 | 1 | 1 | 1 | 1 | 1 | 1 |
| Mooney viscosity (index) | 100 | 108 | 107 | 115 | 95 | 84 | 117 |
| Low heat build-up (tan δ) (index) | 100 | 107 | 109 | 112 | 96 | 85 | 106 |
| Flex crack growth resistance (index) | 100 | 110 | 109 | 107 | 101 | 112 | 84 |

Table 10 shows that the rubber compositions with silica blended therein also provided the same improving effects as those with carbon black blended therein (Tables 8 and 9).

The invention claimed is:

1. A rubber composition for a sidewall, comprising:
a rubber component that contains a modified natural rubber with a phosphorus content of 200 ppm or less; and
carbon black and/or a white filler.

2. The rubber composition for a sidewall according to claim 1,
wherein the rubber composition contains 5 to 60% by mass of the modified natural rubber per 100% by mass of the rubber component.

3. The rubber composition for a sidewall according to claim 1,
wherein the modified natural rubber contains 0.3% by mass or less of nitrogen.

4. The rubber composition for a sidewall according to claim 1,
wherein the modified natural rubber has a gel content of 20% by mass or less, the gel content being determined as the content of a toluene-insoluble matter.

5. The rubber composition for a sidewall according to claim 1,
wherein the modified natural rubber is produced by saponifying natural rubber latex.

6. The rubber composition for a sidewall according to claim 1,
wherein the white filler is silica.

7. A method for producing the rubber composition for a sidewall according to claim 1, the method excluding the step of masticating the modified natural rubber.

8. A pneumatic tire, comprising
a sidewall produced from the rubber composition according to claim 1.

9. A rubber composition for an insulation, comprising:
a rubber component that contains 15 to 95% by mass of a modified natural rubber with a phosphorus content of 200 ppm or less; and
carbon black and/or a white filler.

10. The rubber composition for an insulation according to claim 9,
wherein the modified natural rubber contains 0.3% by mass or less of nitrogen.

11. The rubber composition for an insulation according to claim 9,
wherein the modified natural rubber has a gel content of 20% by mass or less, the gel content being determined as the content of a toluene-insoluble matter.

12. The rubber composition for an insulation according to claim 9,
wherein the modified natural rubber is produced by saponifying natural rubber latex.

13. The rubber composition for an insulation according to claim 9,
wherein the white filler is silica.

14. A method for producing the rubber composition for an insulation according to claim 9, the method excluding the step of masticating the modified natural rubber.

15. A pneumatic tire, comprising
an insulation produced from the rubber composition according to claim 9.

16. A rubber composition for a breaker cushion, comprising:
a rubber component that contains 10 to 90% by mass of a modified natural rubber with a phosphorus content of 200 ppm or less; and
carbon black and/or a white filler.

17. The rubber composition for a breaker cushion according to claim 16,
wherein the modified natural rubber contains 0.3% by mass or less of nitrogen.

18. The rubber composition for a breaker cushion according to claim 16,
wherein the modified natural rubber has a gel content of 20% by mass or less, the gel content being determined as the content of a toluene-insoluble matter.

19. The rubber composition for a breaker cushion according to claim 16,
wherein the modified natural rubber is produced by saponifying natural rubber latex.

20. The rubber composition for a breaker cushion according to claim 16,
wherein the white filler is silica.

21. A method for producing the rubber composition for a breaker cushion according to claim 16, the method excluding the step of masticating the modified natural rubber.

22. A pneumatic tire, comprising
a breaker cushion produced from the rubber composition according to claim 16.

* * * * *